US008626795B2

(12) United States Patent
Jacobson et al.

(10) Patent No.: US 8,626,795 B2
(45) Date of Patent: Jan. 7, 2014

(54) DYNAMIC DATA ASSOCIATION

(75) Inventors: Eric Jacobson, San Jose, CA (US); Les Thomas, Los Gatos, CA (US); Peter Nelson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 464 days.

(21) Appl. No.: 12/940,991

(22) Filed: Nov. 5, 2010

(65) Prior Publication Data

US 2012/0117462 A1    May 10, 2012

(51) Int. Cl.
*G06F 7/00* (2006.01)
(52) U.S. Cl.
USPC ............................ 707/795; 707/961; 715/243
(58) Field of Classification Search
USPC .......... 715/249, 243, 764; 707/953, 961, 602, 707/737, 769, 795
See application file for complete search history.

(56) References Cited

U.S. PATENT DOCUMENTS

| 6,321,158 | B1 |   | 11/2001 | DeLorme et al. |
| 6,766,329 | B1 | * | 7/2004  | Nicholson ............................ 1/1 |
| 7,111,232 | B1 | * | 9/2006  | Bascom ......................... 715/209 |
| 7,181,438 | B1 | * | 2/2007  | Szabo ................... 1/1 |
| 7,774,378 | B2 | * | 8/2010  | Nelson .......................... 707/803 |
| 2003/0167353 | A1 | * | 9/2003 | de Bonet et al. .............. 709/318 |
| 2004/0054549 | A1 |   | 3/2004 | Chittenden et al. |
| 2006/0053382 | A1 | * | 3/2006 | Gardner et al. ............... 715/764 |
| 2007/0061266 | A1 | * | 3/2007 | Moore et al. .................... 705/51 |
| 2009/0216438 | A1 |   | 8/2009 | Shafer |
| 2009/0292465 | A1 |   | 11/2009 | Kaldewey et al. |
| 2010/0075643 | A1 |   | 3/2010 | Cooper et al. |
| 2010/0076994 | A1 | * | 3/2010 | Soroca et al. ................. 707/769 |
| 2010/0082430 | A1 | * | 4/2010 | Ramer et al. ............... 705/14.49 |

* cited by examiner

*Primary Examiner* — Hung T Vy
(74) *Attorney, Agent, or Firm* — Fish & Richardson P.C.

(57) ABSTRACT

Methods, program products, and systems implementing dynamic data association are described. Relations between a first data item and a second data item can be created in an ad hoc manner. The first data item can include a row of data in a table in a relational database. The second data item can include a row of data in the same table, in another table in the relational database, or a document outside the relational database. Configurable metadata can be created to link the first data item and the second data item. The link can be directional. The configurable metadata can include data specified by a user. The configurable metadata can be stored in one or more system tables in the relational database. The configurable metadata can be specific to the user, or to a work group of the user. The configurable metadata can change when the first data item or the second data item is modified.

18 Claims, 9 Drawing Sheets

502

| ID | SourceId | TargetId | CreatedAt | UpdatedAt |
|----|----------|----------|-----------|-----------|
| 1  | 1        | 2        |           |           |
| 1  | 2        | 1        |           |           |

| CollectionID | ColumnId |
|--------------|----------|
| 1            | 1        |
| 1            | 1        |

524

| ID | CollectionID | DataTypeId | Name   | InternalId |
|----|--------------|------------|--------|------------|
| 1  | 1            | 1          | F_name | c_0001     |
| 1  | 2            | 1          | L_name | c_0002     |

| Src_cid | Src_rid | Tgt_cid | Tgt_rid |
|---------|---------|---------|---------|
| 1       | 1       | 2       | 1       |
| 2       | 1       | 1       | 1       |

544

| ID | c_0001 | c_0002    |
|----|--------|-----------|
| 1  | Arnold | Schwarz   |
| 2  | Linda  | Hamil     |
| 3  | Robert | Patterson |

546

| ID | c_0001 | c_0002    |
|----|--------|-----------|
| 1  | Arnold | Schwarz   |
| 2  | Linda  | Hamil     |
| 3  | Robert | Patterson |

FIG. 5C

DYNAMIC DATA ASSOCIATION

TECHNICAL FIELD

This disclosure relates generally to database architecture.

BACKGROUND

A relational database can include a collection of relations, frequently known as tables. A table in the relational database can include a set of data elements or values that are organized using vertical columns and horizontal rows. The table can have a specified number of columns and a variable number of rows. Each column can have a data type that defines what category of data can be stored in the column. A row of a table can include one or more data fields. Each data field can correspond to a column, and have a data type that corresponds to the data type of the column. The type of a data column can be defined by a database schema, which can be a data model that defines how data in the relational database are represented or accessed.

Data in various tables of a relational database can be related in a database join operation. A join operation can combine data fields from two tables by using values common to each of the two tables. A database join can require a condition, also known as a join predicate. A result of the database join can include data from the two tables as well as results of various operations (e.g., mathematical operations, logical operations, or string operations) between various data fields of the tables.

SUMMARY

Methods, program products, and systems implementing dynamic data association are described. Relations between a first data item and a second data item can be created in an ad hoc manner. The first data item can include a row of data in a table in a relational database. The second data item can include a row of data in the same table, in another table in the relational database, or a document outside the relational database. Configurable metadata can be created to link the first data item and the second data item. The link can be unidirectional or bidirectional. The configurable metadata can include data specified by a user. The configurable metadata can be stored in one or more system tables in the relational database. The configurable metadata can be specific to the user, or to a work group of the user. The configurable metadata can change when the first data item or the second data item is modified.

In some implementations, a method implementing dynamic data association can include providing for display in a user interface a view of a first data collection of a database. The first data collection can be formatted using a layout of the first data collection. The method can include receiving an input from the user interface to associate a first data item in the first data collection with one or more second data items of a second data collection. The method can include creating configurable metadata. The configurable metadata can relate the first data item and the one or more second data items. Upon receiving a selection of the first data item, at least one of the one or more second data items can be displayed. The displayed second data item can be formatted using the layout.

In some implementations, a method implementing dynamic data association can include applying various notification mechanisms to the data association. In a collaborative database operating environment, a first user's change to an association on a first client can cause a notification to be sent to a second client for display. The second client can determine, based on the data association and the change, whether to request a data update.

These and other implementations can be utilized to achieve one or more of the following advantages. Data can be associated in an ad hoc manner without requiring database operations. Thus, a user can be free to associate various data without having to define a database operation joining two tables or to change the data in the two tables. A database row can be associated with a document to allow flexible data management of both structured and unstructured data. Configurable metadata that relate a first data item and a second data item can include formatting information specifying ways the association is to be displayed, for example, by specifying a layout that can be applied to the association.

The details of one or more implementations of dynamic data association are set forth in the accompanying drawings and the description below. Other features, aspects, and advantages of dynamic data association will become apparent from the description, the drawings, and the claims

BRIEF DESCRIPTION OF THE DRAWINGS

FIGS. 5A-5C illustrate exemplary data structures for storing configurable metadata.

Like reference symbols in the various drawings indicate like elements.

DETAILED DESCRIPTION

Overview of Dynamic Data Association

Figure 1:
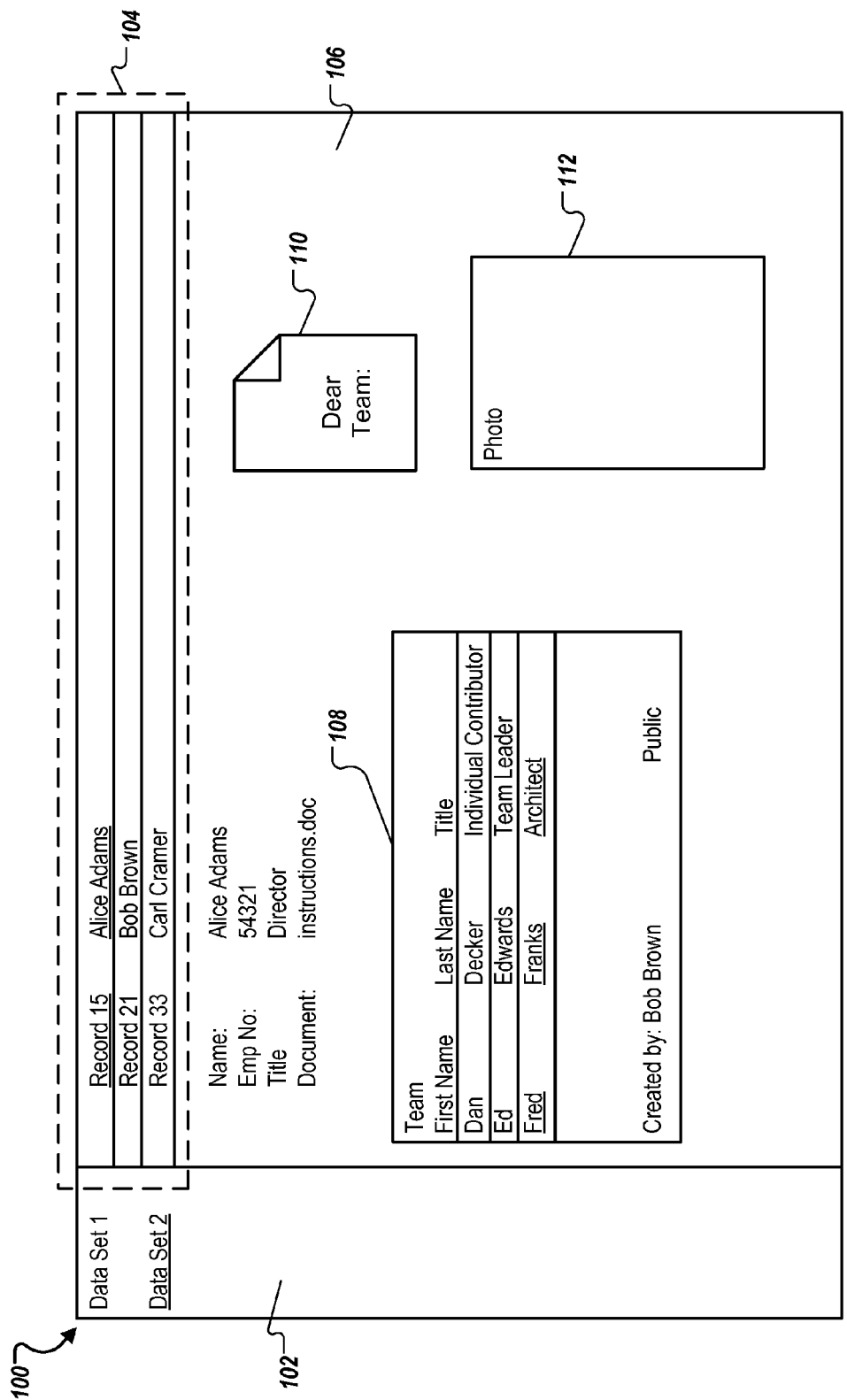
FIG. 1 illustrates an exemplary user interface of dynamic data association.

FIG. 1 illustrates exemplary user interface 100 of dynamic data association. User interface 100 that can include section 102 that lists one or more data sets (e.g., "data set 1" and "data set 2"). Each data set can correspond to a database, a document repository, or a collection. A collection can include a set of one or more data records. For example, a collection can include a database table or a set of data records retrieved in response to a search. Section 102 can be configured to accept a user input selecting a dataset to access. A selected data set can be highlighted (e.g., by using underline).

User interface 100 can include record list section 104 that can display a list of records of the selected data set. The list of records can be selected based on one or more selection criteria (e.g., a selection criterion specified in a structured query language (SQL) query). Record list section 104 can receive user input to select a particular data item (e.g., a data record).

User interface 100 can include main display pane 106 that can display details of the selected data record.

Main display pane 106 can display information relating to the selected data item using a layout. The layout can specify display attributes of a data field, including, for example, location, size, font, and color. The layout can include a theme to be applied to data in the data set. Main display pane 106 can include display area 108 for displaying data items related to the selected data item. The data items displayed in display area 108 can include data items in the currently selected data set, data items in another data set, or data created on-spot. The data created on-spot can include, for example, a user-uploaded file to be associated with the selected data item, or a user-inserted row of data. The data items displayed in display area 108 can be formatted using a specified layout. The specified layout can include the layout for the currently selected data set or data item, a layout of the data set of the related items, or a layout specified for the association. For example, the data items displayed in display area 108 can be formatted using a current display theme. The columns in display area 108 can be formatted according to the layout.

Dynamic data association can include relationships between collections or between a collection and a document. Association between collections can be created in pairs. The association can be created on a row-by-row basis. Configurable metadata can be displayed in display area 108. For example, a name, a duration, a share property, a creator identifier, or a creation date of the association can be specified for the association. The association can be stored separately from the data sets. The association can be created between any types of records. For example, a record in a "people" collection can be associated with a document; a record in a "client" collection can be associated with a record in an "event" collection; a record in a "people" collection can be associated with a record in a "client" collection, and in turn, to a document.

The selected data item (e.g., one of the data records shown in record list section 104) can include a link to a document stored in a document repository. An image (e.g., a thumbnail) 110 of a portion of the document (e.g., a first page) can be displayed in main display pane 106. Like record list section 104, display area 108 can receive a selection input selecting one of the data items. That selected data item can be associated with a second document. An image 112 of a portion of the second document can be displayed in main display pane 106 according to the layout.

Figure 2:
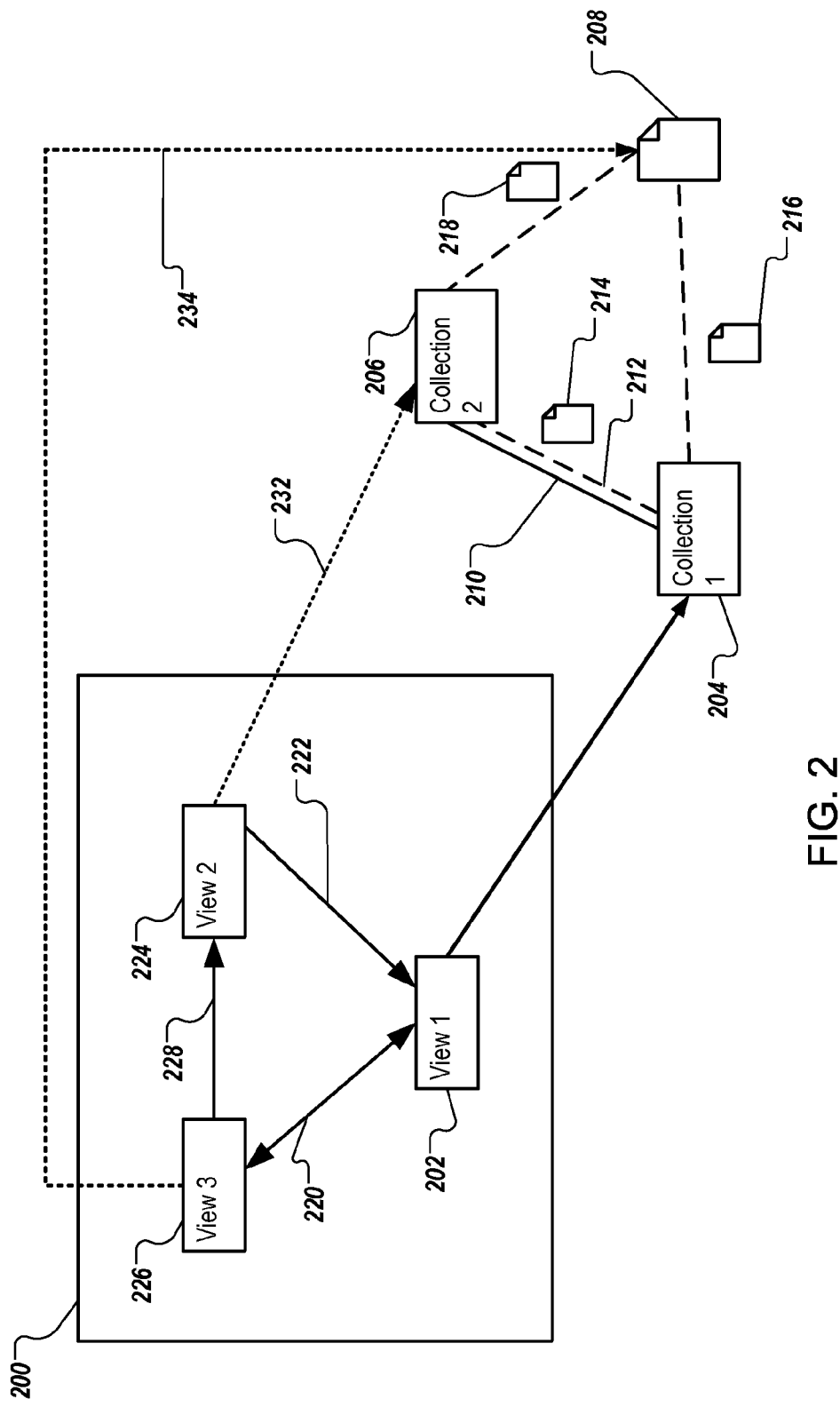
FIG. 2 is a graphical illustration of exemplary relations between associated data.

FIG. 2 is a graphical illustration of exemplary relations between associated data. A database reporting program can provide user interface 200. User interface 200 can include view 202 of data. The data in view 202 can include one or more data records of collection 204 of a relational database.

A first data item (e.g., a data record) of collection 204 can be associated with another data item in collection 204, a second data item in another collection 206, or a third data item in document repository 208. Collections 204 and 206 can relate to each other in a relational database, as represented by solid line 210. The association (as represented by dashed line 212) between the first data item and the second data item can be created independent of the existing relationship between collections 204 and 206. For example, the association between the first data item and the second data item can be independent from a join operation that links collection 204 and collection 206, from a fact table that links collection 204 and collection 206 (where collection 204 and collection 206 are dimension tables), or from access constraints prohibiting a user from creating a user table in the database linking collection 204 and collection 206. The association can include configurable metadata 214. Configurable metadata 214 can include various attributes of the association as described above. Likewise, association between the first data item and the third data item can include configurable metadata 216, when collection 204 is unrelated to document repository 208.

Multiple levels of association can be created. For example, an association between the second data item and the third data item can be created. The association can include configurable metadata 218. The associations between various data items can be created using a graphical user interface such as user interface 200.

The second and third data items, when associated, can be displayed in various views of user interface 200. The views can include view 224 of the second data item, and view 226 of the third data item. The relations between the data items and their sources are represented by dotted arrows 232 and 234. User interface 200 can provide directional navigation functions between the various views, as represented by directional links 228, 220, and 222. Directional links 228, 220, and 222 can reflect a directional (including unidirectional or bidirectional) nature of an association. In a directional association, navigation from a source data item to a target data item can be enabled in user interface 200 (e.g., from view 224 to view 202).

A directional link can allow display of a target data item associated with a source data item when the collection containing the source data item is being selected for browsing in user interface 200. Whether a data item is a source data item or a target data item can be specified in configuration metadata. For example, according to configurable metadata 214, the first data item of collection 204 is a target data item, whereas the second data item of collection 206 is a source data item. Based on configurable metadata 212, when collection 206 is viewed and when the second data item (source) is selected, the first data item can be displayed in view 202. Conversely, when collection 204 is viewed and when the first data item (target) is selected, the second data item can be hidden from display, even though the first data item and the second data item are associated. A change made to the source data item can be reflected at the target data item. The association can be many-to-many.

The second data item can be a source data item in relation to the first data item according to configurable metadata 214, and a target data item in relation to the third data according to configurable metadata 218. Moreover, links can be bidirectional, for example, as specified in configurable metadata 216. In some implementations, a bidirectional link can be created by default.

Creating a Data Association

Figure 3A:
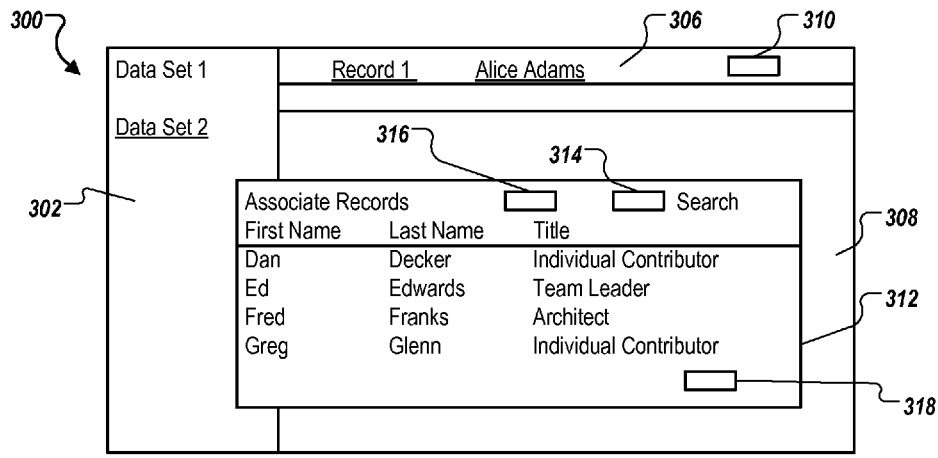
FIGS. 3A and 3B illustrate exemplary user interfaces of creating a data association.
Figure 3B:
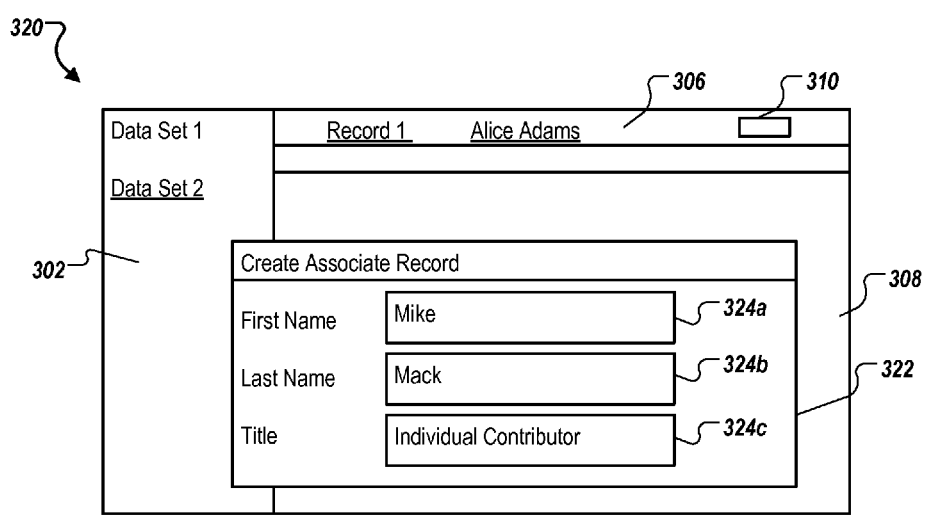

FIGS. 3A and 3B illustrate exemplary user interfaces for creating a data association. FIG. 3A illustrates exemplary user interface 300 for creating a data association. Creating the data association can include adding a relation between a first data item and one or more second data items in a collection. User interface 300 can include portion 302 that can list one or more data sets, first data item 306, and main display pane 308.

User interface 300 can include control 310, which can be configured to accept a user input for creating a data association for first data item 306. Upon receiving the user input, add related data dialog 312 can be displayed. Displaying add related data dialog 312 can include providing a source selection dialog for selecting a data source for the data items to be added. The data source can include a collection, a document, or a search result.

Add related data dialog 312 can display one or more data records from the data source. The data records can include data records in the data source that satisfy a condition. For example, the displayed data records can include one or more search results of a query. The query can include a SQL query defined by a user or one or more search terms specified by the user in search input area 314. Any of the displayed data records can be selected. The selected data record can be designated as a second data item to be associated with the first data item.

Add related data dialog 312 can include input area 316 for specifying various properties of the association between the first data item and the one or more second data items. For example, input area 316 can be used to specify an attribute of the association or a direction of the association, where neither the attribute nor the direction is stored in a collection in the database. Add related data dialog 312 can include control 318. Control 318 (e.g., a button) can be configured to receive an input for adding a new record into the collection.

FIG. 3B illustrates exemplary user interface 320 for creating a new data record for data association. The new data record can be inserted into a collection specified by a user. User interface 320 can include create record dialog 322. Create record dialog 322 can be created in response to an input received from control 318 as described in FIG. 3A. Create record dialog 322 can include exemplary input fields 324a, 324b, and 324c. Each of exemplary input fields 324a, 324b, and 324c can correspond to a data field of the collection into which a new record is going to be inserted. The record can be associated with first data item 306 after being created.

Exemplary Data Structure

Figure 4:
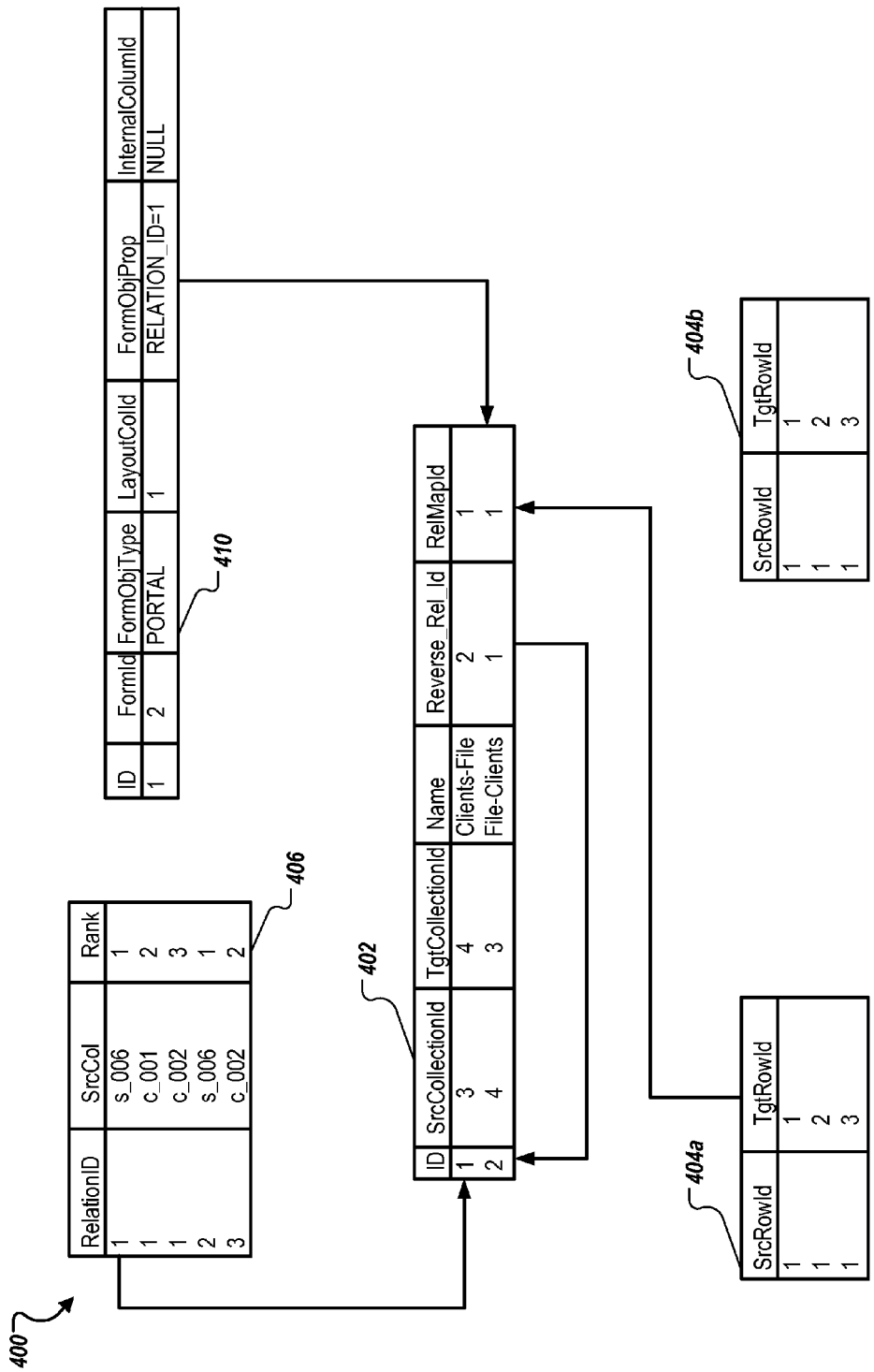
FIG. 4 is a block diagram illustrating an exemplary data structure for implementing dynamic data association.

FIG. 4 is a block diagram illustrating exemplary data structure 400 for implementing dynamic data association. For convenience, the data structure will be described using relational database terms. Other implementations (e.g., an object-oriented data structures) are possible.

Exemplary data structure 400 can include relation definition table 402. Relation definition table 402 can be a system table including a definition of an association and attributes of the association. The attributes can include an identifier of a source collection, an identifier of a target collection, a name of the association, and other metadata. Relation definition table 402 can include an identifier of a reverse relation identifier, which can identify a reverse association of a current association. Relation definition table 402 can include a relation map identifier column that can be used to store an identifier of relation map 404a.

Relation map 404a can be a table that specifies a row-level map for an association. A row level map can map a row in a source collection to a row in a target collection. Data structure 400 can include multiple relation maps (e.g., 404a and 404b). Each relation map can be identified by a name that includes a string (e.g., "relation_map_") and an identifier. Each relation entry defined in relation definition table 402 can correspond to a relation map. A relation entry pair (a relation entry and a reverse of the relation entry) can correspond to a same relational map. If both relation entries in the relation entry pair are deleted, the corresponding relation map can be dropped.

Data structure 400 can include relation presentation table 406. Relation presentation table 406 can include visible columns of a source collection as identified by the source collection identifier in relation definition table 402.

Data structure can include form object 410. Form object 410 can be used to specify display characteristics of the related collections. Form object 410 can include a relation identifier identifying an entry in relation definition table 402.

FIGS. 5A-5C illustrate exemplary data structures for storing configurable metadata. The metadata can include system data for managing the associations, as well as user configurable data. The system data can be specific to a tenancy, which can include a work group of one or more clients. Association metadata operations can allow association operations including, for example, adding, deleting, and updating association between collections. By default, a user-defined collection can automatically be associated with documents, tags, and notes.

FIG. 5A illustrates example association metadata table 502. Association metadata table 502 can include columns that correspond to a source collection identifier, a target collection identifier, a creation date and time, and an update date and time. Other columns can be included.

FIG. 5B illustrates data structure 520 for associating columns of collections. A data item in a source collection can be associated with specified columns of a row of data in a target collection. The specified columns can be represented in association column table 522 and column metadata table 524. Association column table 522 can include data columns for storing a collection identifier and a column identifier in the collection. Each row of data in association column table 522 can be associated with one or more rows of data in column metadata table 524. Column metadata table 524 can include columns for storing an identifier of the collection to which a column belongs, a data type identifier for identifying a data type of the column, a name of the column, and an internal identifier of the column.

FIG. 5C illustrates data structure 540 for associating rows of collections. Row association table 542 can include columns for storing a source collection identifier, a source row identifier, a target collection identifier, and a target row identifier. The source collection identifier can identify source collection 544. The source row identifier can identify a row in source collection 544. The target collection identifier can identify target collection 546. The target row identifier can identify a row in target collection 546. In a bidirectional association, two rows can be created in row association table 542, one pointing from a source row to target row and the other pointing from a target row to source row.

A client having read and write privileges to a source collection and a target collection can insert, update, or delete a row association between the source collection and the target collection. Inserting, deleting, and updating the row association can include updating row association table 542. Inserting a new row association can include inserting a record in row association table 542 associating a source row ID with a target row ID. To reflect the insertion, the client can refresh an associated view or update displayed content via notification. Updating an association can include changing row content of a source row or a target row. To reflect the update, the client can refresh an associated view or update displayed content via notification. In some implementations where an association is bidirectional, deleting a row from either the source collection or the target collection can automatically delete all associations with that row. In addition, the association itself can be deleted, in which case the server can delete all associations. To reflect the deletion, the client can refresh an associated view or update displayed content via notification.

Exemplary Dynamic Data Association Operations

Figure 6:
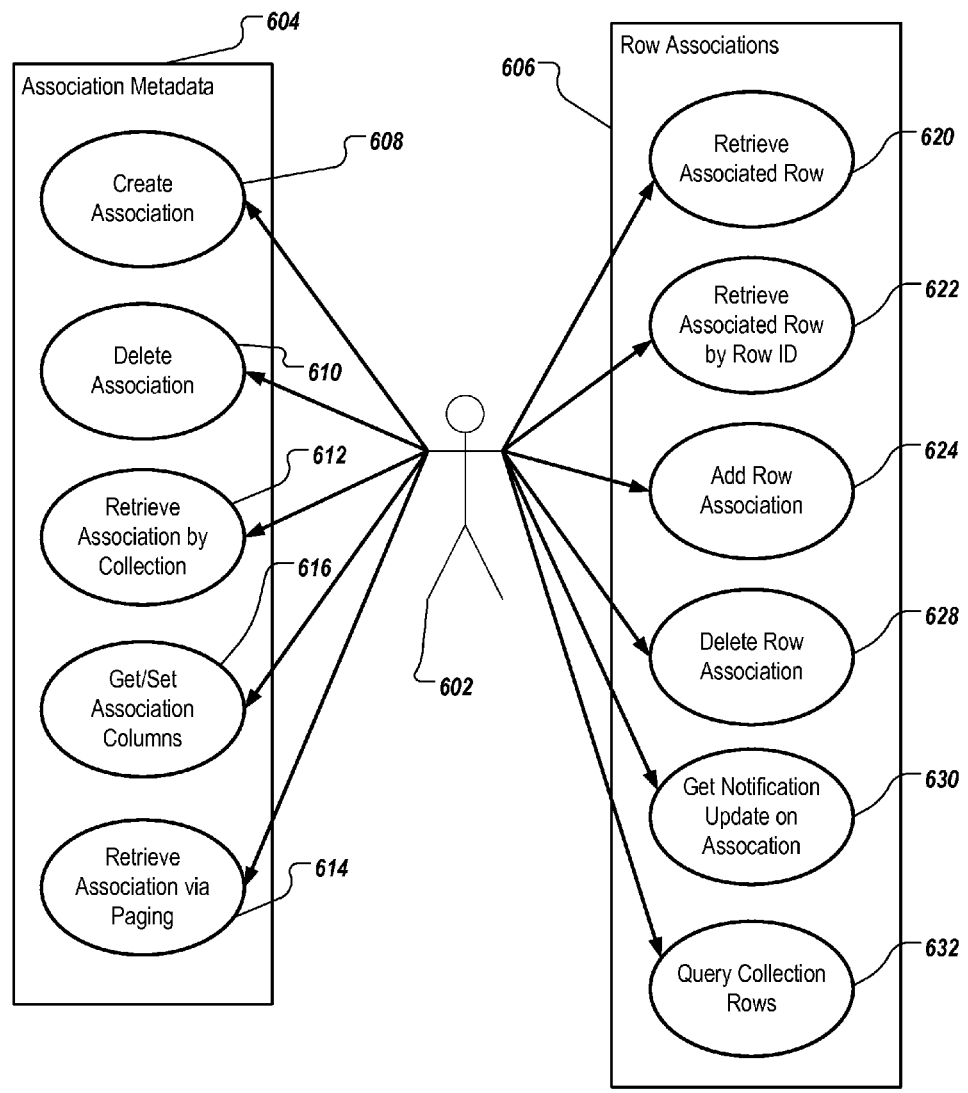
FIG. 6 illustrates exemplary notification operations of dynamic data association.

FIG. 6 illustrates exemplary notification operations of dynamic data association. Client 602 can interact with a server to perform various operations on association metadata 604 and row associations 606.

The server can maintain association metadata 604 that relates to all associations. Each tenancy can correspond to a distinct set of association metadata 604. Operations on association metadata 604 can include create association operation 608. Create association operation 608 can include a function call using a session identifier, a source collection identifier, and a target collection identifier as arguments. On success, the function can return an instance of an association object. One or more associations can be created between a source collection and a target collection. Operations on association metadata 604 can include delete association operation 610. Delete association operation 610 can include a function call using the association object as an argument. If the source collection or target collection is dropped, associations involving the source collection or target collection can be deleted.

Operations on association metadata 604 can include retrieve association operation 612. Retrieve association operation 612 can include a function call using a session identifier and a source collection identifier as arguments. The function call can return a list of one or more association objects. Operations on association metadata 604 can include operation 614 for retrieving associations via paging. Operation 614 can include a function call using a query handle, a source collection identifier, and a session identifier as arguments. The query handle can include an identifier of a query that can retrieve results in pages. The function call of operation 614 can additionally use a query object, a query option object, and an order object as arguments. The query object can specify a query for retrieving data including row identifiers. The query option object can specify which portion of a result set of the query is to be retrieved as a page. The order object can specify a sort order.

Operations on association metadata 604 can include get or set association columns operation 616. Get or set association columns operation 616 can be used to set up columns that comprise an association view. A get association columns operation can be used to retrieve a set of one or more columns of the target collection that are associated with the source collection. The columns can be displayed in the association view. The get association columns operation can include a function call using arguments including a session identifier and an association identifier. A set association column operation can include a function call using arguments including a session identifier, an association identifier, a collection identifier, and a list of columns.

Once association metadata 604 are setup, row associations 606 can be set up by associating a row from a source collection to a row in a target collection. Operations on row associations 606 can include retrieve associated rows operation 620, which can retrieve all associated rows based on a source collection identifier, a target collection identifier, and a source row identifier. The retrieved rows can include column fields that are set up in the associated view as associated columns.

Operations on row associations 606 can include retrieve associated rows by row ID operation 622. Retrieve associated rows by row ID operation 622 can be used to retrieve associated rows based on a source collection identifier, a target collection identifier, a source row identifier, and one or more target row identifiers. The retrieved rows can include column fields that are set up in the associated view as associated columns.

Operations on row associations 606 can include add associated rows operation 624 and delete associated rows operation 628. Add associated rows operation 624 can include a function call using arguments including a session identifier, a source collection identifier, a target collection identifier, a source row identifier, and one or more target row identifiers. Likewise, delete associated rows operation 628 can include a function call using arguments including a session identifier, source collection identifier, a target collection identifier, a source row identifier, and one or more target row identifiers.

Operations on row associations 606 can include get notification update on association operation 630. Get notification update on association operation 630 can be used to get notifications set for row IDs about updates of rows in a source collection. The row association between a source row ID and a target row can also change. The change can include an update of a target row, a deletion of a target row, an insertion of a row association, or a deletion of a row association. A notification log can be maintained for the association. The notification log can include entries of various events causing row association to change. As an association is added or deleted, a new entry is inserted into the notification log. Get notification update on association operation 630 can return a query result object including a notification handle. The notification handle can include a point-in-time marker of the notification log for the association. The notification handle can be used to query the association log to retrieve updates for target rows that have changed since the point in time. The notification handle can be updated upon each get notification update on association operation 630. Get notification update on association operation 630 can include a function call using parameters including a session identifier, a source collection identifier, a source row identifier, and a notification handle. The result of the function call can include a list of one or more row identifiers of rows that have been updated, and a new notification handle.

Operations on row associations 606 can include query collection rows operation 632. Implementations of query collection rows operation 632 can include lazy fetch and eager fetch. In a lazy fetch mode, the query can return collection rows. Associated rows can be fetched using another query. In eager fetch mode, the query can return collection rows as well as rows associated with the collection rows. A specifiable parameter can be used to configure query collection rows operation 632 to operate in the eager mode or the lazy mode.

Exemplary Notification

Figure 7:
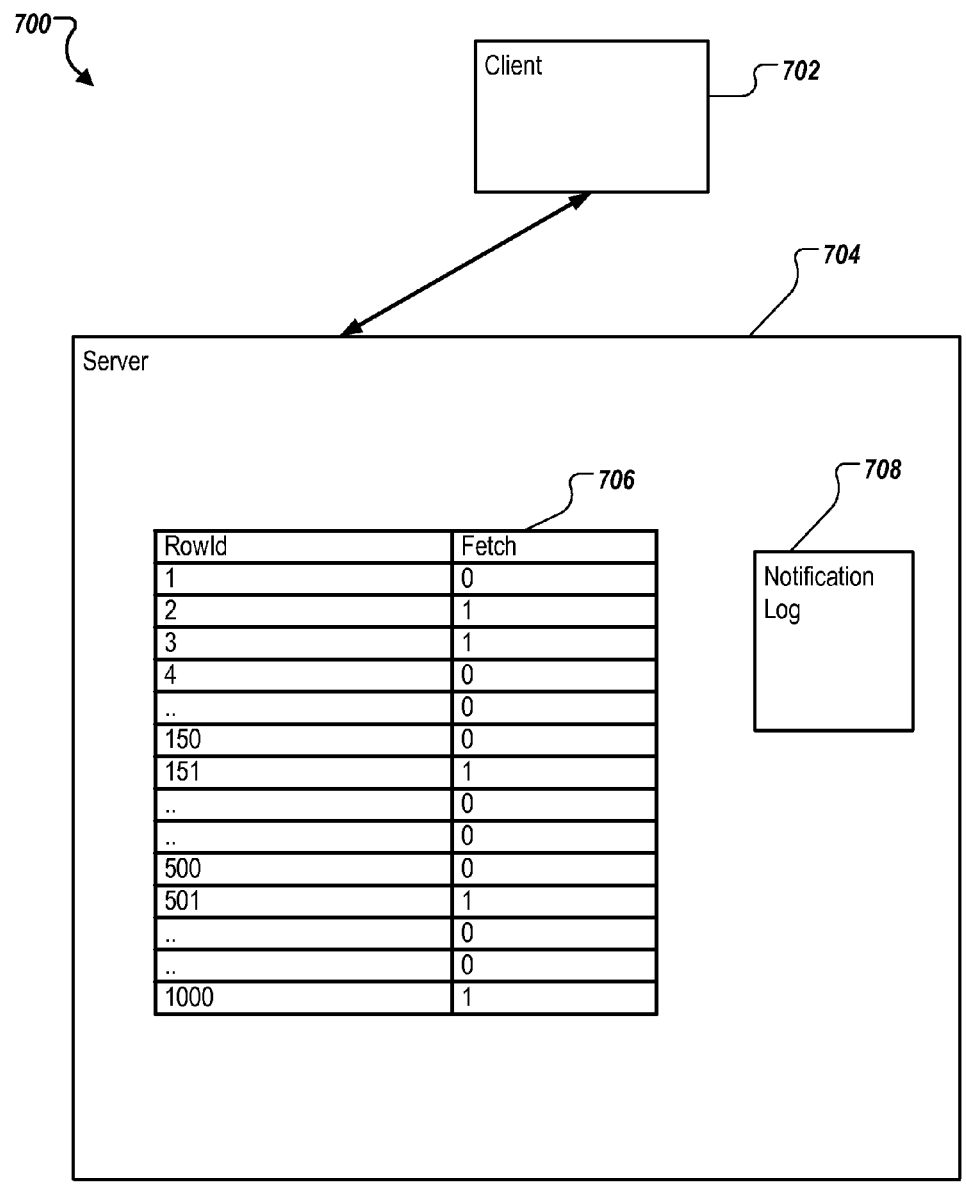
FIG. 7 is block diagram illustrating an exemplary system implementing notification features and operations of dynamic data association.

FIG. 7 is block diagram illustrating exemplary system 700 implementing notification features and operations of dynamic data association. System 700 can include client 702 and server 704 connected through a communications network.

Client 702 can submit a data request to server 704. The data request can include a query and a query context. Server 704 can store row IDs of an entire result set of the query in paging cache 706. Server 704 can send only a portion of the row IDs to the client. The portion can be determined by a page size specified in the query context by client 702. Client 702 can fetch multiple pages for the same query as the client navigates through pages of the result set.

Client 702 can request notification when rows retrieved by the query are updated. Client 702 can request that server 704 send a notification to client 702 when row IDs already sent to client 702 are updated. Server 704 can maintain a data (e.g., a "fetch" flag) in a data structure that stores the row IDs. When client 702 fetches a page, server 704 can walk through the cached row IDs and mark those pages fetched by the client as fetched. When client 702 requests a notification, server 704 can filter the row IDs using the fetch flag.

Server 704 can track which row is updated in notification log 708. Notification log 708 can store row IDs in association with event types in a time-based series of notification entries. The notification entries can be entered when an event occurs on a row. Server 704 can send a marker indicating where the last notification occurred in the time-based series to client 702 as a notification handle, as part of the notification. Server 704 can update the marker each time a notification is sent.

Client 702 can request a notification on a collection to include updates on rows of data associated with the collection. To request the notification, client 702 can invoke a function on server 704 using parameters including a list of one or more collection identifiers, a list of one or more notification handles, a list of one or more query handles, and a list of notification types. A query handle can specify a query that corresponds to a paged result set. A notification type can specify what types of events (e.g., an insertion, a deletion, an update, or any combination of the above) are to be notified. The notification type can serve as a filter of the notification.

Server 704 can store association context information in notification log 708. Association context information can include information of an association that allows server 704 to notify client 702 when a new association is created, when an association is deleted, or when an association is updated. The information can be tracked in a source row ID data field and a source collection identifier data field in a notification entry The data fields can allow client 702 to filter that notification by the source row identifier or the source collection identifier.

Exemplary Processes of Dynamic Data Association

Figure 8:
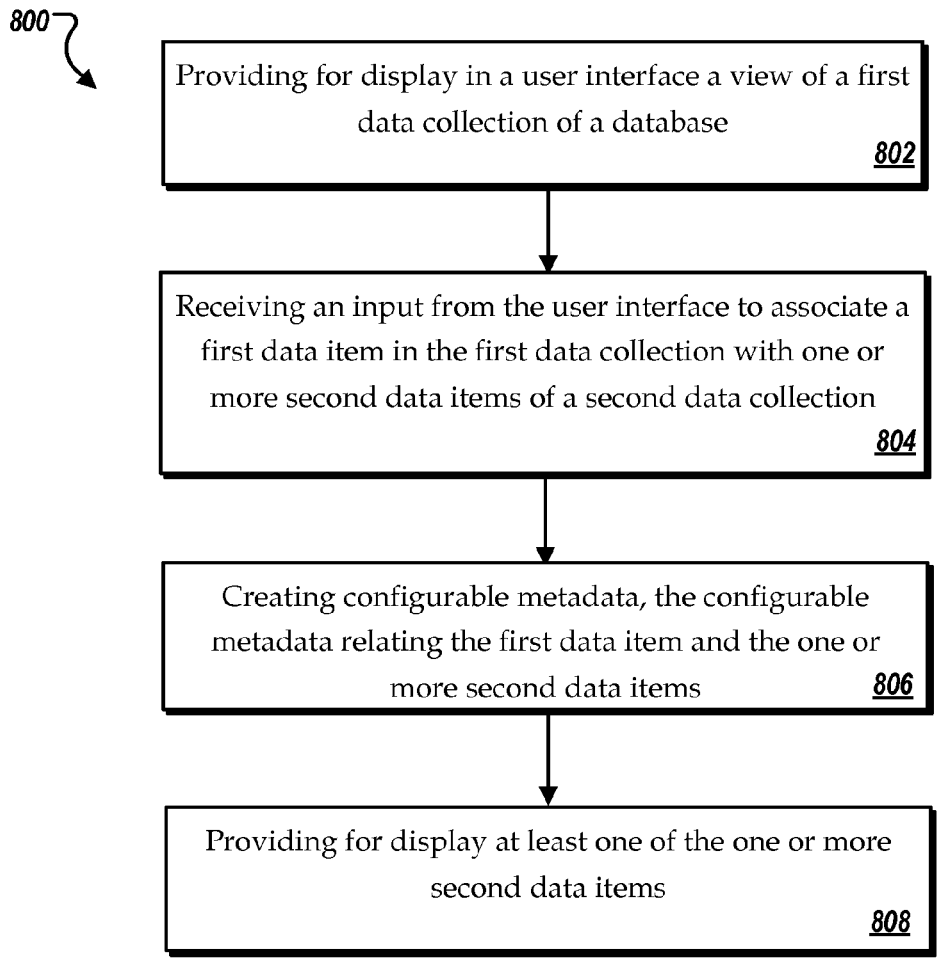
FIG. 8 is a flowchart illustrating exemplary processes of dynamic data association.

FIG. 8 is flowchart illustrating exemplary process 800 of dynamic data association. A system including one or more computing devices can provide (802) for display in a user interface a view of a first data collection of a database. The first data collection can be formatted using a layout of the first data collection.

The system can receive (804) an input from the user interface to associate a first data item in the first data collection with one or more second data items of a second data collection. Receiving the input can include receiving a direction of access. The direction of access can specify a source data item (e.g., the first data item) and one or more destination data items (e.g., the second data items) where navigation is permitted from the source data item to the destination data item. The direction of access can additionally specify that the layout of the first data collection is to be applied to the one or more second data items. The direction of access can include a unidirectional link or a bidirectional link. The association can be self-referential, where the one or more second items can be in the first data collection. In some implementations, the second data collection can be structurally different from the first data collection. For example, the second data collection can include a document repository storing unstructured data.

The system can create (806) configurable metadata for associating the first data item and the one or more second data items. The configurable metadata can include an association of data identifiers that relates the first data item and the one or more second data items. Creating the configurable metadata can include identifying a first data identifier (e.g., a row identifier) of the first data item and a second data identifier of each of the one or more second data items. Creating the configurable metadata can further include associating the first data identifier and the second data identifier with the direction of access specified in the input.

Upon receiving of the first data item, the system can provide (808) for display at least one of the one or more second data items. The second data item can be formatted using the layout of the first data collection.

In some implementations, process 800 can include receiving, from the user interface, an update event of the second data item displayed in the user interface. The update event can include a modification of the second data item. The system can submit a refresh request to a server in response to the update event. In some implementations, process 800 can include updating the displayed second data item upon receiving, from a server, a refresh notification indicating that the second data item has been remotely modified.

In some implementations, the configurable metadata can include a notification threshold (e.g., 1,000 rows). The notification threshold can be used to determine when to update all data in an association simultaneously and when to update the data in the association using paging. Process 800 can include receiving, from a server, a refresh notification. The refresh notification can indicate that at least one of the one or more second data items has been modified remotely. The system can determine that a count (e.g., 2,500 rows) of second data items indicated as modified in the refresh notification exceeds the notification threshold. Upon the determination, the system can determine that the at least one of the one or more second data items is being displayed, for example, by identifying the portion of the rows that are currently displayed. The system can request, from the server, an update of the least one of the one or more second data items being displayed. The notification threshold can be user-configurable.

Figure 9:
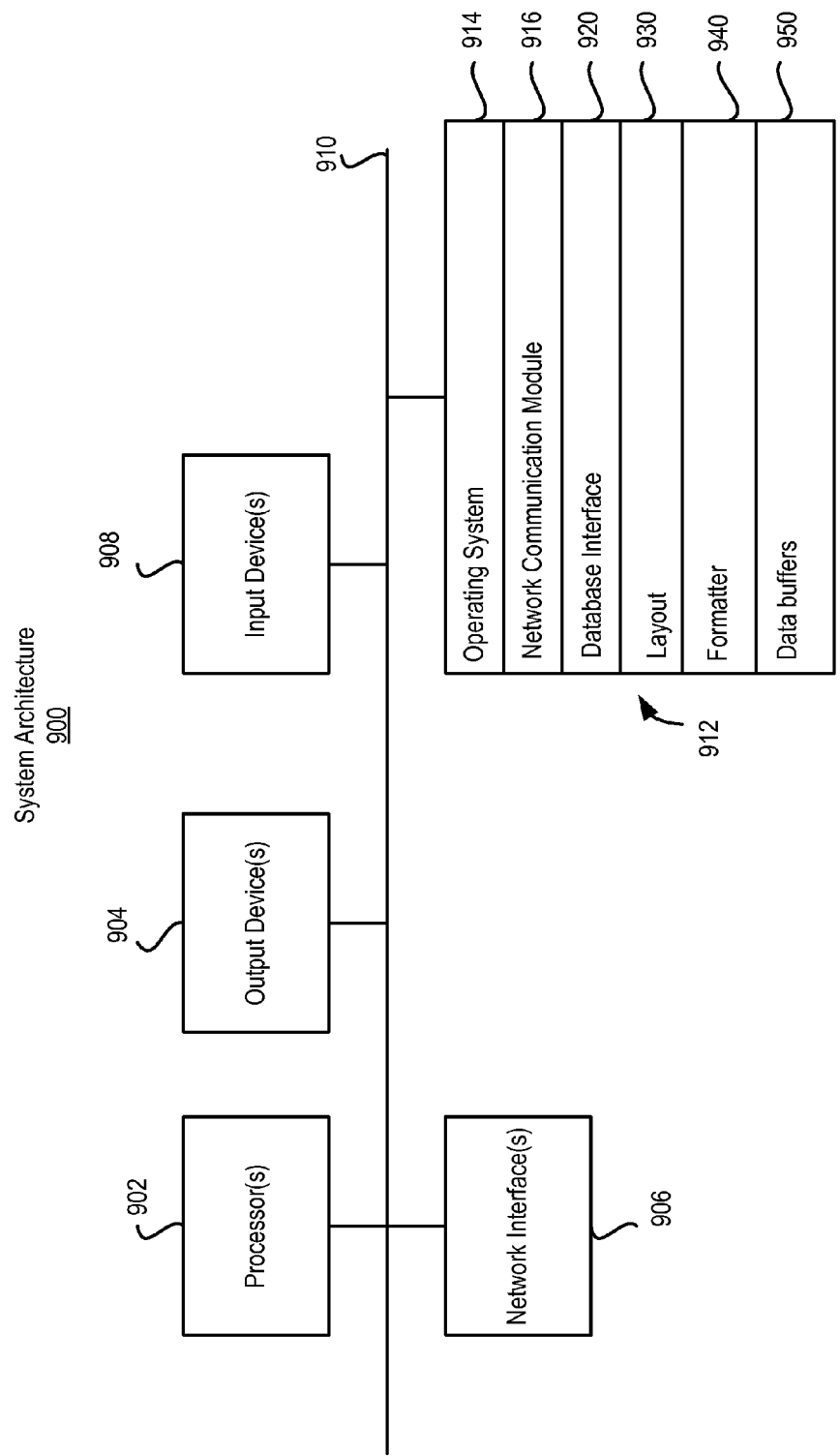
FIG. 9 is a block diagram of an exemplary system architecture for implementing the dynamic data association features and operations.

In some implementations, the system can share configurable metadata within a work group (e.g., a tenancy). The work group can include one or more users. Process 800 can include removing the at least one of the one or more second data items from display upon receiving a refresh notification indicating that the configurable metadata have been removed by a user in the work group Exemplary System Architecture FIG. 9 is a block diagram of an exemplary system architecture 900 for implementing the features and operations of dynamic data association. Other architectures are possible, including architectures with more or fewer components. In some implementations, architecture 900 includes one or more processors 902 (e.g., dual-core Intel® Xeon® Processors), one or more output devices 904 (e.g., LCD), one or more network interfaces 906, one or more input devices 908 (e.g., mouse, keyboard, touch-sensitive display) and one or more computer-readable mediums 912 (e.g., RAM, ROM, SDRAM, hard disk, optical disk, flash memory, etc.). These components can exchange communications and data over one or more communication channels 910 (e.g., buses), which can utilize various hardware and software for facilitating the transfer of data and control signals between components.

The term "computer-readable medium" refers to any medium that participates in providing instructions to processor 902 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 912 can further include operating system 914 (e.g., Mac OS® server, Windows® NT server), network communication module 916, database interface 920, layout 930, formatter 940, and data buffers 950. Database interface 920 can provide one or more interfaces between a server computer and a client computer and interfaces between a relational database and other application program. Layout 930 can provide formatting information for data items being viewed. Formatter 940 can layout 930 to various data items, including source data items and target data items in an association. Data buffers 950 can include a data identifier buffer and a data record buffer used in paging and notification. The data identifier buffers can store one or more data identifiers (including target row IDs in an association) that are paged. The data record buffer can store actual data being displayed.

Operating system 914 can be multi-user, multiprocessing, multitasking, multithreading, real time, etc. Operating system 914 performs basic tasks, including but not limited to: recognizing input from and providing output to devices 904 and 908; keeping track and managing files and directories on computer-readable mediums 912 (e.g., memory or a storage device); controlling peripheral devices; and managing traffic on the one or more communication channels 910. Network communications module 916 includes various components for establishing and maintaining network connections (e.g., software for implementing communication protocols, such as TCP/IP, HTTP, etc.). Database interface 920 can include interface to various databases including relational databases.

Architecture 900 can be included in any device capable of hosting a database application program. Architecture 900 can be implemented in a parallel processing or peer-to-peer infrastructure or on a single device with one or more processors. Software can include multiple software components or can be a single body of code.

The described features can be implemented advantageously in one or more computer program products that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), or plasma monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention. Accordingly, other implementations are within the scope of the following claims.

What is claimed is:

1. A method executed by one or more computing devices, the method comprising:
   providing for display in a user interface a view of a data collection of a database, the data collection being defined by a schema of the database and being related to other data collections in the database according to the schema, the data collection being formatted using a layout of the data collection;
   receiving an input from the user interface to associate a data item in the data collection with a document stored in a document repository that is outside of the database and is configured to store the document independent of a database schema;
   creating configurable metadata, the configurable metadata including an association between the data item and the document, the association allowing a user to navigate, in the view, from the data item inside of the database to the document outside of the database; and
   upon receiving a selection of data item, providing for display at least a portion of the document, the portion of the document being formatted using the layout.

2. The method of claim 1, where receiving the input includes receiving a direction of access, the direction of access specifying that the layout of the data collection is to be applied to the document.

3. The method of claim 2, where the association is represented in the direction of access.

4. The method of claim 3, where the direction of access includes a unidirectional link or bidirectional link.

5. The method of claim 1, where the association between the data item and the document is created independent of a database join between the data item and the document.

6. The method of claim 1, where the document is represented using a thumbnail image in the user interface.

7. The method of claim 1, where the document repository is configured to store unstructured data.

8. The method of claim 1, further comprising:
receiving, from the user interface, an update event of the document; and
in response to the update event, submitting a refresh request to a server.

9. The method of claim 1, further comprising updating a representation of the document upon receiving a refresh notification indicating that the document has been remotely modified.

10. The method of claim 1, where the configurable metadata includes a configurable notification threshold.

11. The method of claim 1, further comprising sharing the configurable metadata within a work group, the work group including one or more users.

12. The method of claim 11, further comprising removing a representation of the document from display upon receiving a refresh notification indicating that the configurable metadata have been removed by a user in the work group.

13. A computer program product stored on a storage device, the product operable to cause one or more processors to perform operations comprising:
providing for display in a user interface a view of a data collection of a database, the data collection being defined by a schema of the database and being related to other data collections in the database according to the schema, the data collection being formatted using a layout of the first data collection;
receiving an input from the user interface to associate a data item in the data collection with a document stored in a document repository that is outside of the database and is configured to store the document independent of a database schema;
creating configurable metadata, the configurable metadata including an association between the data item and the document, the association allowing a user to navigate, in the view, from the data item inside of the database to the document outside of the database; and
upon receiving a selection of data item, displaying at least a portion of the document, the portion of the document being formatted using the layout.

14. The product of claim 13, where receiving the input includes receiving a direction of access, the direction of access specifying that the layout of the data collection is to be applied to the document.

15. The product of claim 14 where the association is represented in the direction of access.

16. A system comprising:
one or more processors configured to perform operations comprising:
providing for display in a user interface a view of a data collection of a database, the data collection being defined by a schema of the database and being related to other data collections in the database according to the schema, the data collection being formatted using a layout of the first data collection;
receiving an input from the user interface to associate a data item in the data collection with a document stored in a document repository that is outside of the database and is configured to store the document independent of a database schema;
creating configurable metadata, the configurable metadata including an association between the data item and document, the association allowing a user to navigate, in the view, from the data item inside of the database to the document outside of the database; and
upon receiving a selection of data item, displaying at least a portion of the document, the displayed portion of the document being formatted using the layout.

17. The system of claim 16, the operations further comprising updating a representation of the document upon receiving a refresh notification indicating that the document has been remotely modified.

18. The system of claim 16, further comprising sharing the configurable metadata within a work group including one or more users.

* * * * *